United States Patent [19]

Van den Bossche

[11] 4,238,453

[45] Dec. 9, 1980

[54] CATALYST SPRAY NOZZLE

[75] Inventor: Henri A. Van den Bossche, Antwerp, Belgium

[73] Assignee: National Distillers and Chemical Corporation, New York, N.Y.

[21] Appl. No.: 966,452

[22] Filed: Dec. 4, 1978

Related U.S. Application Data

[62] Division of Ser. No. 853,601, Nov. 21, 1977, Pat. No. 4,163,040.

[51] Int. Cl.³ .............................. B01J 3/04; B05B 1/32; C08F 2/00; C08F 110/02
[52] U.S. Cl. .................................. 422/131; 137/540; 137/541; 239/453; 422/242; 422/310; 526/86; 526/352.2
[58] Field of Search .................. 422/131, 242, 310; 137/540, 541; 239/87, 453, 455, 459

[56] References Cited

U.S. PATENT DOCUMENTS

| | | | |
|---|---|---|---|
| 2,035,203 | 3/1936 | Smith | 239/452 X |
| 2,063,709 | 12/1936 | Taylor | 239/453 |
| 2,901,185 | 8/1959 | Dickey | 239/453 |
| 3,035,780 | 5/1962 | Peras | 239/453 |
| 3,093,317 | 6/1963 | Simmons et al. | 239/453 |
| 3,165,383 | 1/1965 | Murray et al. | 422/131 |
| 3,243,127 | 3/1966 | Watson | 239/453 |
| 3,246,660 | 4/1966 | Hammelmann | 239/453 X |
| 3,317,252 | 5/1967 | Gassman | 137/540 X |
| 3,421,701 | 1/1969 | Walters | 239/453 |
| 3,499,605 | 3/1970 | Dreisen | 239/453 X |
| 3,503,418 | 3/1970 | Petrucci et al. | 137/540 X |
| 3,738,976 | 6/1973 | Heavin | 422/131 X |
| 4,034,917 | 7/1977 | Bailey | 239/453 |

OTHER PUBLICATIONS

Blades et al., Application Ser. No. 8354, filed Feb. 3, 1970, Laid open to public inspection on Mar. 16, 1971, as noted at 884 O. G.733.

*Primary Examiner*—Joseph Scovronek
*Attorney, Agent, or Firm*—Kenneth D. Tremain

[57] ABSTRACT

A catalyst spray nozzle for injecting a finely atomized spray of liquid catalyst into a high pressure chemical reactor such as an autoclave reaction vessel for polymerizing ethylene into polyethylene. The liquid catalyst is fed under pressure to the discharge end of a passageway in the spray nozzle. A cylindrical valve member is positioned in a cylindrical compartment disposed adjacent to and coaxially with the discharge end of the passageway, and is biased against the discharge end by a spring coaxially positioned in the compartment. The spring biased valve element prevents liquid catalyst from passing through the nozzle until a given backpressure on the catalyst is established. When the given backpressure is reached, the pressure biases the valve member away from the passageway and the catalyst is forced through at least one discharge orifice under sufficient pressure to cause it to be sprayed in a finely atomized state into the reactor. A second embodiment is also disclosed in which belleville washers are utilized to bias the valve element closed against the discharge end of the passageway.

4 Claims, 4 Drawing Figures

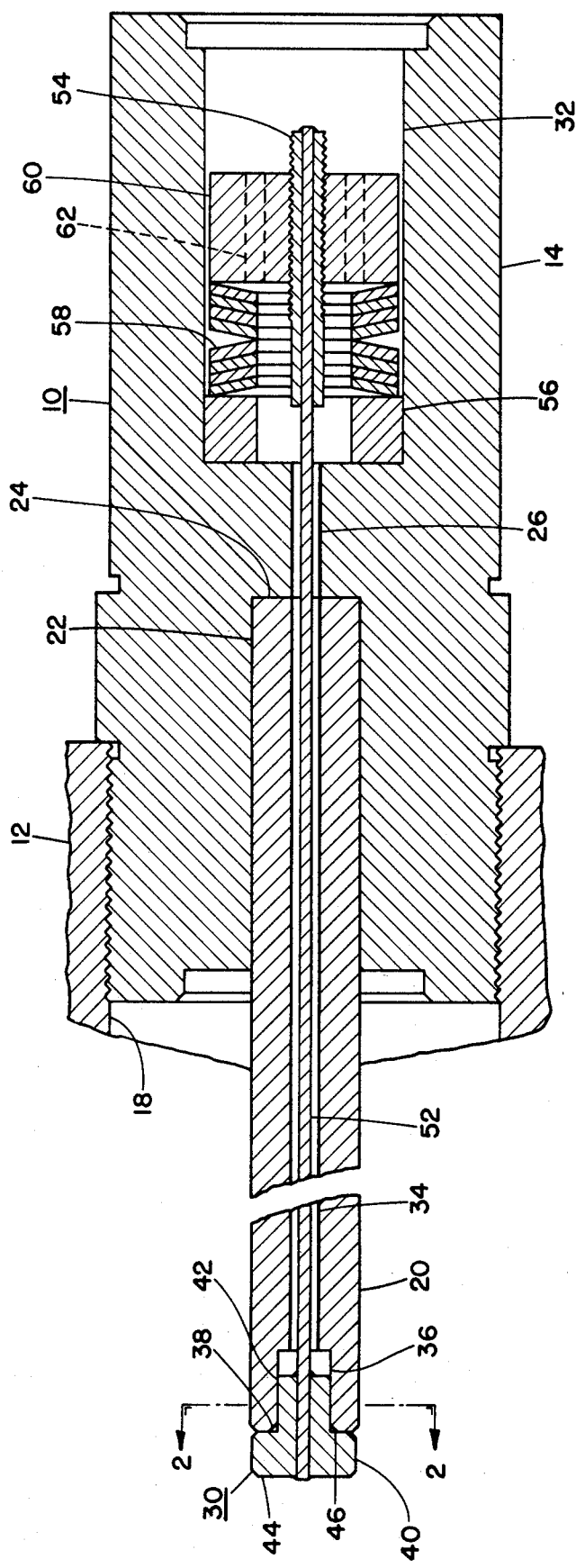
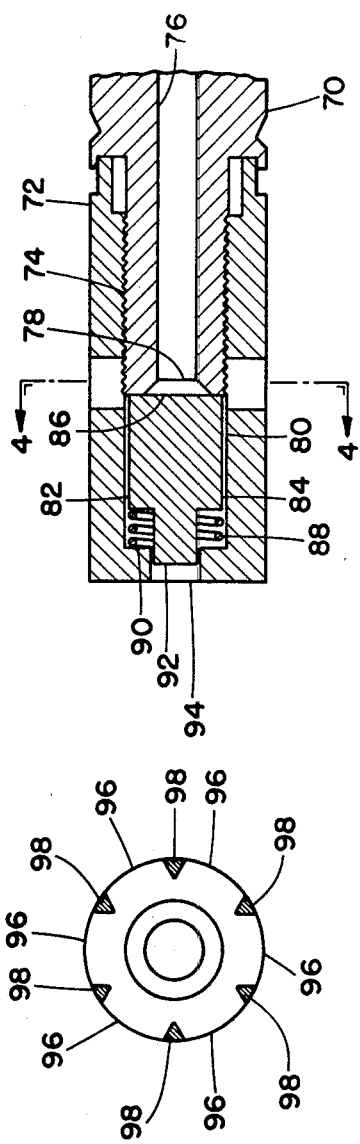
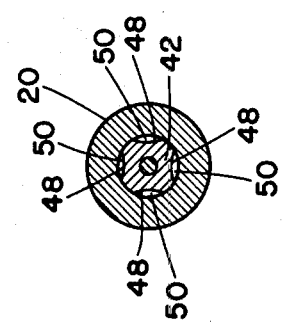
FIG. 1
FIG. 2
FIG. 3
FIG. 4

CATALYST SPRAY NOZZLE

This is a division of application Ser. No. 853,601, filed Nov. 21, 1977, now U.S. Pat. No. 4,163,040, issued July 31, 1979.

BACKGROUND OF THE INVENTION

1. Field of the Invention

The present invention relates, in general, to a catalyst injection nozzle for a high-pressure chemical reactor such as an autoclave reactor for polymerizing ethylene into polyethylene. More particularly, the present invention is directed to an improved catalyst injection nozzle for spraying liquid catalyst in a finely atomized state into a high-pressure chemical reactor vessel.

2. Discussion of the Prior Art

Various types of high pressure chemical reactors have been developed in the chemical arts in which catalytic agents are injected into an ongoing chemical reaction to secondarily promote the reaction. One technical area in which reactors of this type are utilized is in the polymerization of a monoolefin such as ethylene into a polymer. A reactor of this type is described in Pugh et al. U.S. Pat. No. 3,756,996 granted to National Distillers and Chemical Corporation on Sept. 4, 1973, and more recently in Platz et al. patent application Ser. No. 714,451 filed Aug. 16, 1976 for Ethylene Polymerization Reactor, now U.S. Pat. No. 4,071,325, issued Jan. 31, 1978 also assigned to National Distillers and Chemical Corporation.

In autoclave reactors of this type, catalyst is injected into the reaction mixture at various entry ports along the length of the reaction vessel. The successful operation of the polymerization process is often critically dependent upon the accurate and reproducible uniform injection of given quantities of catalyst into the chemical reaction. It is desirable that the catalyst be dispersed to the greatest possible extent throughout the reaction materials such that the catalyst promotes the polymerization process in a uniform manner throughout all of the materials. An effective dispersal of the catalyst avoids the formation of hot spots in the mixture which may be caused by concentrations of catalyst at different locations within the reaction materials.

Liquid catalysts suitable for use in reactors of this type include highly oxygenated agents such as peroxide catalysts which give up oxygen at the elevated temperatures which are present in autoclave reactors.

U.S. Pat. No. 4,002,813 to Steinert et al. discloses a catalyst injection system for the polymerization reaction of a monoolefin, such as ethylene, in which the catalyst stream is delivered to the reaction vessel through a separate infeed conduit. The infeed conduit terminates in an orifice tip which is located within and is substantially coplanar with the entry port of the monomer stream into the reaction vessel. This arrangement results in the catalyst being injected into the reaction vessel in the midst of the monomer stream as it is fed to the reactor. A drawback of this system lies in that it does not produce a widespread dispersal of the catalyst within the reaction mixture.

U.S. Pat. No. 3,738,976 to Heavin discloses a system for introducing a catalyst slurry into the polymerization zone of a reactor in which the catalyst slurry is pressurized by passage through a transport zone. The transport zone includes an orifice which is closed by a spring-biased element so that a given pressure differential must be maintained across the orifice before catalyst is injection sprayed into the reaction zone. This catalyst introduction system is designed for low pressure reactors, with the pressures referred to in the patent being at about atmospheric or somewhat higher. The catalyst introduction system described in Heavin includes an axially movable shaft for opening and closing the catalyst injection aperture. The shaft extends through a wall of the reactor to a spring positioned outside thereof, and with a plurality of packing rings being placed around the shaft in order to seal the reactor. Packing rings of this nature, although effective in low pressure environment, generally will not function properly in a high pressure reactor of the type for which the present invention has been designed, and would result in the leakage of reactant materials past the shaft. Even if the packing rings were to be replaced by another type of sealing arrangement, there would always be sealing problems due to the inherent nature of the Heavin design in which an axially movable shaft for controlling the catalyst injection aperture extends through the reactor wall. This arrangement must allow for axial movement of the shaft while requiring the sealing over a tremendous pressure differential present along the shaft.

Smith U.S. Pat. No. 2.035,203 to Smith discloses a spray nozzle for dispersing a fuel to an internal combustion engine in an atomized spray. In this instance, the spray is injected through a plurality of discrete orifices rather than uniformly, so as to render the nozzle structure unsuitable for the injection of an atomized spray of a liquid catalyst into a high-pressure chemical reactor.

In view thereof, a new design for a catalyst spray nozzle is required which allows for the introduction of an atomized spray of liquid catalyst into a high pressure reactor with pressures commonly exceeding 20,000 psi, and which functions effectively without undue danger of a leak of reaction materials by the catalyst spray injector nozzle, as might be incurred in a catalyst spray injector design of the type disclosed in the prior art.

SUMMARY OF THE INVENTION

Accordingly, the present invention contemplates the provision of a catalyst spray nozzle for a high-pressure reactor for polymerizing ethylene into polyethylene, and particularly the utilization therewith of a novel and unique nozzle which will facilitate the introduction of liquid catalyst in a finely atomized spray state into the reactor. Further, the present invention as described herein provides a unique method for introducing liquid catalyst in a state consisting of a finely atomized spray into a high pressure reactor for polymerizing ethylene into polyethylene.

In accordance with a preferred embodiment of the invention, there is disclosed a method and apparatus involving a liquid catalyst injection nozzle for a high pressure chemical reactor in which an injector housing has an injector orifice formed therein and through which liquid catalyst is dispersed into the reactor. A valve element is provided for closing the orifice, and the catalyst injection nozzle includes means, mounted entirely within the housing, for biasing the valve element with a predetermined force into a normally orifice-closing position. By positioning the biasing means entirely within the injector housing, the reactor wall is not breached by an axially movable shaft and, accordingly, there is eliminated the problem of sealing an axially movable shaft against an extremely high pressure differential. The liquid catalyst is supplied to the injection orifice at a sufficiently high pressure to overcome the predetermined force holding the valve element in closing relationship against the orifice, thereby forcing the two components apart and allowing liquid catalyst to be propelled through the resultant gap formed therebetween, thereby causing the liquid catalyst being injected into the reactor as an atomized spray.

Moreover, in accordance with a first preferred embodiment of the invention, the injection orifice includes a first cylindrically shaped portion adjacent its discharge and, while the valve element includes a cylindrically shaped first section which is positioned within the first portion of the injection orifice. Additionally, in this embodiment, the valve element includes a second cylindrical section having a larger diameter than the first cylindrical section, with the two sections forming an annular shoulder at their juncture, and wherein the annular shoulder is located adjacent to the discharge end of the injection orifice. Further, the cylindrical outer wall of the first section of the valve element includes several flat wall portions extending axially therealong, to thereby permit liquid catalyst to flow in an axial direction along the nozzle in the gaps formed between the first cylindrical aperture and the flats formed by the axially extending flat wall portions of the first section of the valve element. The injection orifice also includes a second cylindrical portion having a larger diameter than the first portion, and wherein there is coaxially mounted the biasing means, preferably in the form of a spring. A rod projects axially through the injection orifice, being connected at one end thereof to the first cylindrical section of the valve element and at the other end to the spring. The arrangement is such that the spring normally biases the annular shoulder of the valve element into a closing position against the discharge end of the injection or catalyst dispersing orifice. In this embodiment of the invention the spring is formed of a plurality of belleville or conical plate spring washers, and the rod passing axially through the washers is provided with an externally threaded portion adjacent the washers. A nut is mounted on the threaded portion of the rod, and is threaded thereon so as to contact the spring washers, and may be rotated to selectively adjust the extent of the force desired for biasing the valve element against the discharge end of the injection orifice. The nut is provided with a plurality of axial through-holes to allow the passage therethrough of liquid catalyst.

Further, in accordance with a second embodiment of the invention, the valve element is cylindrically shaped, and is movably positioned within a cylindrically shaped opening in the housing. The cylindrically shaped opening extends coaxially with the injection orifice, and a first end of the cylindrical valve element abuts the discharge end of the injection orifice. The biasing means also includes a compressed spring mounted within the opening and coaxial therewith. The spring abuts the second end of the cylindrical valve element, and functions to force the first end of the element against the discharge end of the injection aperture. This embodiment of the invention is characterized in that the valve housing has a plurality of radially extending passageways formed symmetrically about the location where the first end of the valve element abuts against the discharge end of the injection aperture, and the catalyst is radially sprayed through these passageways into the reactor. Moreover, the discharge end of the injection orifice is interiorly bevelled where the first end of the valve element abuts thereagainst. Further, the injector housing is formed of first and second housing portions, the first housing portion having a substantially cylindrical shape, and the injection orifice axially extending therethrough. This first portion has its outer cylindrical surface threaded at the discharge end of the injection orifice. The second housing portion constitutes a cylindrically shaped cap for the first portion, and has a cylindrically shaped opening extending axially over a substantial portion of its length. Internal threads are formed at one end of the opening, and are adapted to threadedly engage the external threads on the first housing portion. The valve element is coaxially positioned within the opening in the second housing portion, and the radially extending passageways are formed in the second housing portion adjacent to the location where the first end of the valve element abuts against the discharge end of the injection orifice.

Accordingly, it is a primary object of the present invention to provide both a method and apparatus involving a liquid catalyst injection nozzle which is specifically designed for utilization with a high pressure reaction vessel such as an autoclave reactor for polymerizing ethylene into polyethylene.

Another object of the present invention is to provide a method and apparatus utilizing a liquid catalyst spray nozzle of the type described which results in the liquid catalyst being sprayed into the reactor in a finely atomized state so as to effectively disperse the catalyst throughout the materials in the reactor.

A more specific object of the present invention lies in the provision a method and apparatus in which a catalyst spray nozzle of the type described is completely contained within a single housing so that portions of the nozzle, which may be difficult to seal, do not project beyond the nozzle housing or the reactor walls, thereby obviating any sealing problems for the nozzle.

BRIEF DESCRIPTION OF THE DRAWINGS

The foregoing and other objects and advantages of the inventive method and apparatus involving a liquid catalyst injection nozzle constructed pursuant to the teachings of the present invention may be more readily understood by one skilled in the art, having reference to the following detailed description of several preferred embodiments thereof taken in conjunction with the accompanying drawings; in which:

FIG. 1 is a longitudinal sectional view of a first embodiment of a liquid catalyst injection nozzle constructed pursuant to the teachings of the present invention;

FIG. 2 is a sectional view of the catalyst injection nozzle taken along line 2—2 of FIG. 1;

FIG. 3 is a fragmentary, longitudinal sectional view of a second embodiment of a catalyst injection nozzle constructed according to the teachings of the present invention; and FIG. 4 is a sectional view taken along line 4—4 in FIG. 3, illustrating the radially extending passageways through which liquid catalyst is sprayed in an atomized state into the reactor.

DETAILED DESCRIPTION OF THE DRAWINGS

Referring now in detail to the drawings, FIG. 1 illustrates a catalyst injection nozzle 10 adapted to be mounted within a wall 12 of a chemical reactor (not shown), and having an axially extending cylindrical outer housing portion 14. Preferably, housing portion 14 extends into the reactor body through an aperture 18 formed in wall 12, with the housing portion being held against the reactor by a flange, comprising wall 12 end with the sealing being effected by a suitable cone ring or lensring. A cylindrical tubular member 20, of a smaller diameter than the housing portion 14, extends coaxially within the housing portion and secures the components 14 and 20 into an integral assembly. The tubular member 20 extends from its supports within a cylindrical bore 22 formed centrally within housing portion 14, having one end thereof abut against a shoulder 24 formed by a smaller diameter bore 26 coaxial with bore 22. The tubular member 20 then projects to an appropriate extent into the reactor at a location in which liquid catalyst is injected through a discharge orifice section 30 into the reactor materials. The tubular member 20, as illustrated in FIG. 1, does not have the full length thereof shown therein. Each of the components 14 and 20 is formed of a suitable metal, preferably a good quality steel, such as stainless steel, due to its contact with catalyst, and are joined together by a suitable fastening means, for instance, by brazing.

In the illustrated embodiment, catalyst flows through a catalyst injection passageway which extends the full length of the nozzle assembly. The passageway is defined by a first large diameter central bore 32 in the housing 14 which extends through a substantial portion of its length, and which is then adjoined by smaller bore 26 which extends along the length of the housing 14 until it connects with a central bore 34 formed in and extending centrally through the tubular member 20. Bore 34 communicates with a larger diameter cylindrical bore 36 formed coaxially therewith at the end of tubing member 20 proximate the discharge orifice section 30 of the injection nozzle. The end of the bore 36 is internally chamfered at 38 so as to form a diverging frusto-conical surface. In operation this tapered surface promotes the uniform flow of liquid catalyst as a finely atomized spray from the discharge end of the injection orifice in cooperation with a valve element 40. The element 40 has a first substantially cylindrical section 42 which is axially movable within the bore 36 in closely fitted relationship therewith. A larger diameter cylindrical section 44 extends from section 42 so as to form a flat annular disc-like shoulder surface 46 at their juncture. The annular shoulder surface 46 fits snugly against the end wall surface of tubular member 20. Preferably, the contacting surfaces of tubing member 20 and element 40, in effect, surface 46 and the end surface of tubing member 20 contacted thereby, and surfaces 36 and 44 may be formed of a STELLITE alloy in order to afford an enhanced degree of wear-resistance. As may be seen more clearly in FIG. 2, this smaller cylindrical section 42 has four axially extending flats 48 spaced about its circumferential surface along the entire length of the section so as to allow liquid catalyst to flow axially through the the gaps 50 formed between the flats and the bore wall 36 to the annular shoulder 46 of the valve element.

A central rod member 52 extends longitudinally from valve element 40 through the tubular member into the bore 32 of the injection nozzle. The central rod 52 is brazed, at one end thereof, into an aperture or bore centrally formed in valve element 40, and is brazed at its other end into an aperture formed in an externally threaded bushing 54 which extends axially within the large diameter bore 32. A bushing 56 is placed at the inner axial end of the bore 32 in engagement with the shoulder formed by the juncture with bore 26, and a plurality of stacked conical plate springs or belleville washers 58 are then coaxially positioned over the bushing 56. Half of the belleville washers 58 are oriented so their frusto-conical surfaces face one way, and the other half are oriented to face in an opposite direction. In lieu of the washers it is also possible to utilize a coil spring. A nut 60 threadedly engages the external threads of the bushing 54 and is screwed thereon to such an extent until it bears against the end surface of the outer most belleville washer or spring 58. With the arrangement illustrated, it may be seen that tighening of the nut 60 on the bushing 54 results in rod 52 being placed in tension and spring 60 in compression and the annular shoulder 46 of valve element 40 being pressed against the discharge end of the catalyst injection nozzle. The more the nut is tightened down against the bushing, the more rod 52 is placed in tension and the springs 60 compressed, and the greater is the force which forces the shoulder 46 of valve element 40 against the discharge end of the catalyst injection nozzle tube member 20. A plurality of axially extending apertures 62 are formed in the adjustment nut 60 in a radially extending symmetrical pattern so as to allow catalyst to flow under pressure from the bore 32, which is connected to a catalyst supply source (not shown), through the axial holes formed in the nut through the center of the belleville washers, through bore 26 into bore 34 within the tubular member 20, into bore 36 and through the gaps 50 to the annular space between shoulder 46 and chamber 38.

With this arrangement when the nut 60 is tightened against the belleville washers so as to place the rod 52 in tension, and also when liquid catalyst flows down the catalyst injection passageway under a relatively low pressure, the tensile force which holds the annular shoulder 46 of the valve element against the discharge end of the catalyst injection dispersing orifice, prevents catalyst from being injected into the reactor vessel. However, as the back pressure on the catalyst is increased, a pressure level will be reached which is sufficiently large to cause an axial movement of valve member 40 away from the end of the tube member 20, thereby producing an annular opening or orifice between the components. The catalyst, at that time, is subjected to a relatively high back pressure, and this back pressure forces the catalyst through the annular orifice so as cause its being uniformly sprayed through the orifice into the reactor in a finely atomized state.

One embodiment of the invention constructed, as shown in FIGS. 1 and 2, may be adjusted by means of nut 60 so that a 1,000 psi pressure differential between the catalyst feed and the reactor interior is required to bias the valve member 40 away from the end of tube member 20 and allow a finely atomized spray of catalyst to be injected into the reactor. Tests of a catalyst spray nozzle constructed as described herein were used to inject an atomized liquid spray catalyst into an autoclave type reactor for the polymerization of polyethylene. The spray nozzle produced a more stable reaction within the reactor vessel allowing catalyst to be more efficiently utilized and resulting in a reduction in the quantity of required catalyst material. Commercially this results in a substantial savings of catalyst and in a more efficient operation of the reactor. Further, the polyethylene produced in the reactor has slightly better optical characteristics than polyethylene produced without the inventive spray nozzles. This may be explained by the decrease in catalyst consumption. The catalyst preferentially dissolves in the liquid phase of the two-phase gas-polyethylene mixture. A surplus amount of catalyst therein likely initiates cross-linking and long chain branching of the polyethylene molecules which results in inferior optical characteristics being imparted to the resultant polyethylene product. A decrease in the amount of catalyst, as produced by the present invention, has the opposite effect, resulting in less cross-linking and long chain branching of the polyethylene molecules which provides improved optical characteristics in the resultant polyethylene product. Moreover, improved optical characteristics also result from the reduction in the amount of catalyst carrier. In effect, it is known that the catalyst carriers, which are normally hydrocarbons, have chain-transfer capacities.

FIG. 3 of the drawing illustrates a second embodiment of the present invention. In this embodiment, the nozzle structure is formed of a first cylindrical housing member 70 and a second cylindrical housing member 72, the latter of which forms a cap for the housing member 70. The housing members 70 and 72 have respectively, external and internal threads at 74 adapted to threadingly engage to secure the housing members together. The housing member 70 has a cylindrical bore 76 formed therein which extends axially along its entire length and leads from a catalyst supply source (not shown) to its discharge end 78. The discharge end 78 of the injection bore 76 is provided with a diverging taper in the form of a frusto-conical surface to allow catalyst to be efficiently discharged from the bore 76. The housing member 72 has a cylindrical compartment 80 formed therein within which there is axially movably arranged a valve element 82. The valve element 82 includes a large diameter cylindrical section 84 which has a first end surface 86 abutting against the discharge end 78 of the catalyst injection bore 76. The valve element is biased into closing contact with the discharge end 78 of the catalyst injection orifice by the action of a coil spring 88 which is positioned at its second end and is normally compressed between the interior end wall portion 90 of the cap 72 and the second end of the cylindrical section 84 of the valve element. The valve element 82 also includes a smaller cylindrical section 92 projecting from larger section 84, which extends into a cylindrical bore 94, of smaller diameter than compartment 80, formed at the axial end of the cap, and which serves as a guide for the movable valve element. As shown in FIG. 4, six radially extending passageways 96 are formed in the cap housing member 72 communicating with compartment 80 proximate to where the valve element 82 abuts the discharge end of the catalyst injection bore end 78. When the pressure of the catalyst feed system is sufficiently great to force the valve element 82 away from the discharge end 78 of the catalyst injection bore 76 in opposition to the force exerted by compressed spring 88, catalyst is sprayed in a finely atomized state through the radial passageways 96. This finely atomized spray is injected through the passageways 96 into the reactor materials flowing past the catalyst injection nozzle. The radial passageways 96 in the housing cap have six support struts 98 extending between the portions of the cap housing 72 separated thereby. These struts should encompass the minimum surface area necessary to mechanically join the portions of the cap housing 72 on either side thereof as this maximizes the uniform spreading of radially sprayed catalyst reaching the reactive materials in a finely atomized state.

While several embodiments of methods and apparatus involving a liquid catalyst injection nozzle have been described in detail herein, the teachings of the present invention will suggest many alternative embodiments to those of ordinary skill in the art.

What we claim is:

1. In a high pressure reactor for polymerizing ethylene into polyethylene, the improvement comprising a liquid catalyst injection nozzle for injecting a finely atomized spray of liquid catalyst into the reactor, said nozzle comprising:
 (a) an injector housing having therein an injection passageway with a discharge end through which liquid catalyst is injected into the reactor, said housing having a flat, radially oriented annular surface at said discharge end, said housing further including a substantially cylindrically shaped compartment adjacent to said discharge end and extending coaxially with said injection passageway;
 (b) a valve element having a large diameter section and a smaller diameter section positioned coaxially with respect to said large diameter section and an annular shoulder being formed between said large and smaller diameter sections, with the valve element being axially movably positioned in said compartment, and the end of said large diameter cylindrical section including a surface complementary to said flat, radially oriented annular surface on said housing and abutting the discharge end of said injection passageway to close thereagainst;
 (c) means mounted entirely within said housing compartment for normally biasing said complementary surface of said valve element into closing engagement with said annular surface at the discharge end of said passageway with a predetermined force, said biasing means including a spring compressively arranged within said compartment and coaxial therewith around said smaller diameter cylindrical section and abutting against said annular shoulder on the valve element to bias the complementary end of said large diameter cylindrical section into closing engagement with said discharge end of the injection passageway at said predetermined force;
 (d) means for enabling the liquid catalyst to be supplied to said injection passageway at a pressure in excess of and opposite to the predetermined force of said biasing means to bias said valve element away from engagement with the discharge end of said injection passageway and facilitate liquid catalyst to be expelled through the space therebetween, atomizing said liquid catalyst and causing said catalyst to be radially injected between said radially oriented surfaces into the reactor as an atomized spray.

2. In a high pressure polyethylene reactor as claimed in claim 1, said injector housing having a plurality of radially extending passages symmetrically spaced about the location where the first end of the valve element abuts against the discharge end of said injection passageway and through which catalyst is radially sprayed into the reactor.

3. In a high pressure polyethylene reactor as claimed in claim 2, the discharge end of said injection passageway being interiorly bevelled where the first end of the valve element abuts thereagainst.

4. In a high pressure polyethylene reactor as claimed in claim 3, said injector housing being formed of first and second portions; said first housing portion having a substantially cylindrical shape and said injection passageway extending axially therethrough, and the exterior cylindrical surface being threaded at the discharge end of said injection passageway, said second housing portion forming a cylindrical cap for said first portion, said cylindrical shaped opening extending axially through a substantial portion of its length, internal threads formed at one end of the opening and threadedly engaging the external threads on said first housing portion, said valve element being coaxially positioned within said opening in second housing portion, said radially extending passageways being formed in said second housing portion adjacent to where the first end of the valve element abuts against the discharge end of the injection passageway in said first housing portion.

* * * * *